(12) United States Patent
Indira

(10) Patent No.: US 6,553,001 B1
(45) Date of Patent: Apr. 22, 2003

(54) TECHNIQUE FOR USE IN CONJUNCTION WITH AN ISDN TERMINAL ADAPTER FOR EXPEDITIOUSLY AND AUTOMATICALLY PERFORMING ISDN SWITCH TYPE DETECTION AND SPID CONFIGURATION

(75) Inventor: Asha Indira, Reston, VA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/252,273

(22) Filed: Feb. 18, 1999

(51) Int. Cl.$^7$ ................................................ H04J 3/12
(52) U.S. Cl. .................... 370/252; 370/255; 370/524
(58) Field of Search ............................. 370/250, 251, 370/252, 255, 257, 524

(56) References Cited

U.S. PATENT DOCUMENTS 6,046,986 A * 4/2000 Glass et al. ................ 370/252
6,118,796 A * 9/2000 Best et al. .................. 370/252
6,246,671 B1 * 6/2001 Lattanzi et al. ............. 370/254

FOREIGN PATENT DOCUMENTS

WO    WO 98/51120    11/1998

* cited by examiner

Primary Examiner—Melvin Marcelo
(74) Attorney, Agent, or Firm—Michaelson & Wallace; Peter L. Michaelson

(57) ABSTRACT

A technique for inclusion within, e.g., ISDN DTE, and use in conjunction with an ISDN terminal adapter (as DCE) for automatically providing ISDN switch type detection and SPID configuration. Specifically, switch type detection occurs by analyzing D-channel ISDN initialization messages received from the local ISDN switch as well as, subsequently, where appropriate, responding D-channel ISDN messages, received from the switch to specific ISDN messages sent by the adapter. If the switch type is one that requires a SPID, a SPID is formed using a predefined generic NI-1 format, for each B-channel through which communication is being established, and sent to the switch, using an NI-1 terminal initialization request, to invoke initialization.

38 Claims, 7 Drawing Sheets

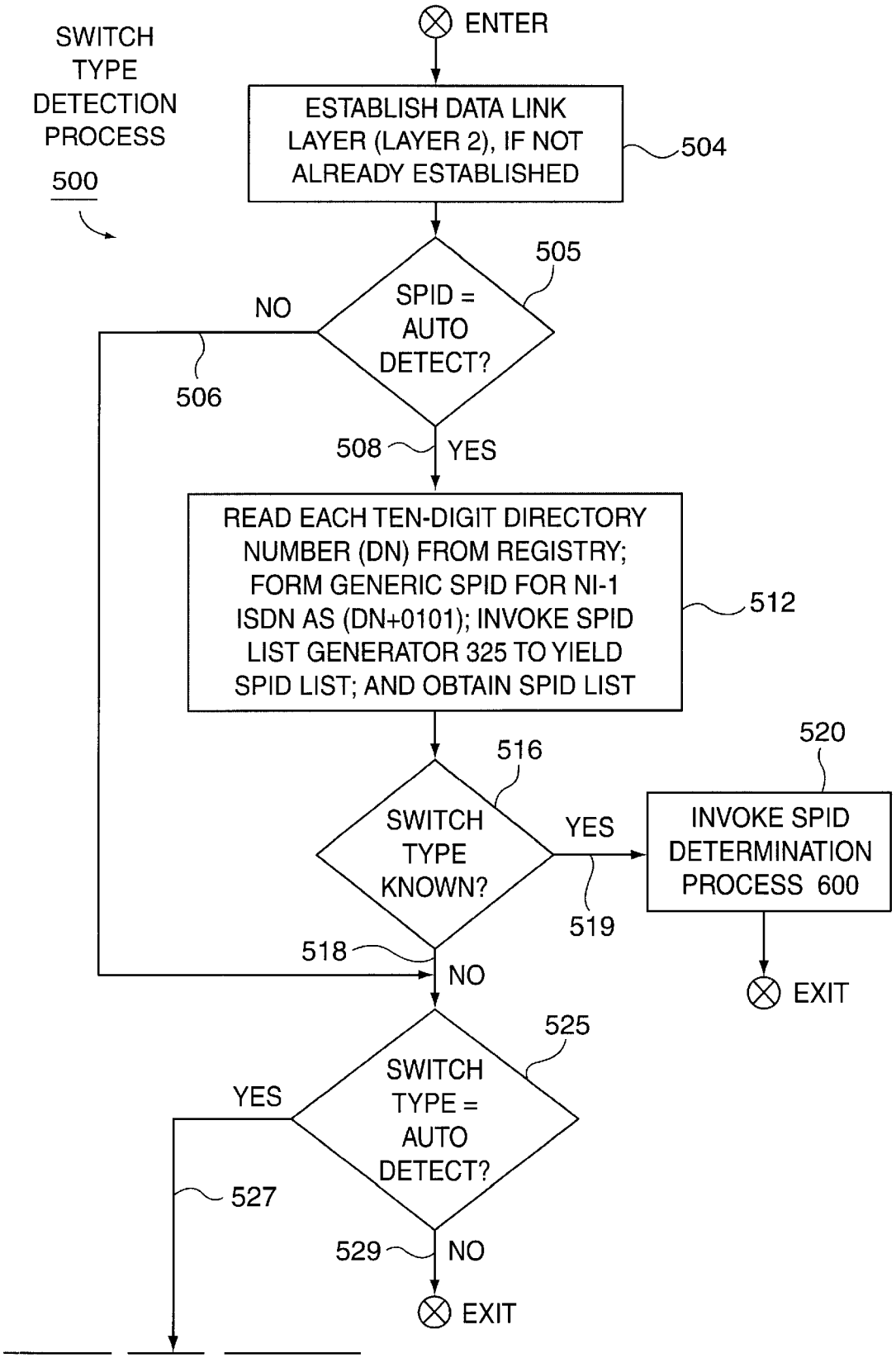

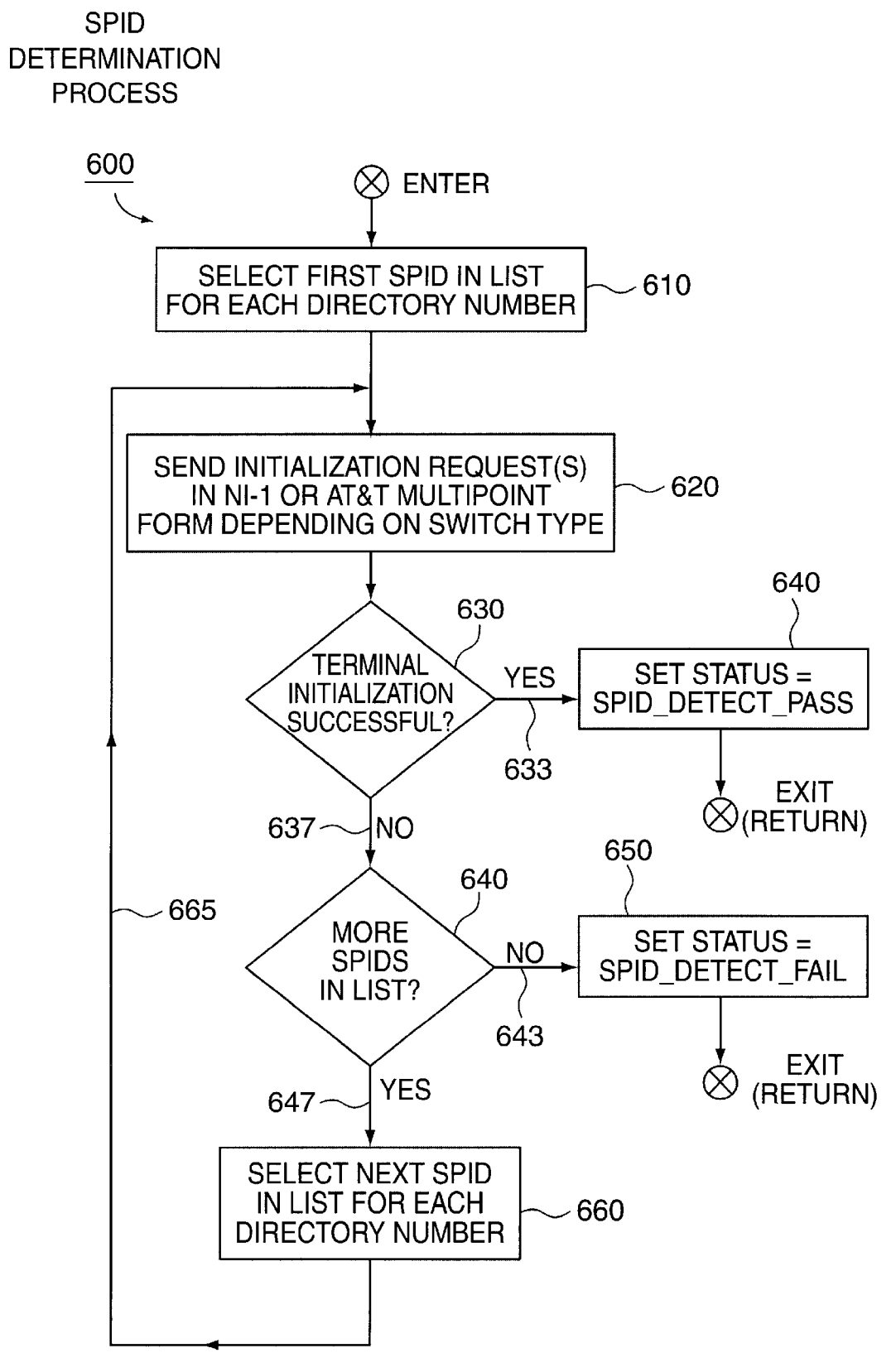

TECHNIQUE FOR USE IN CONJUNCTION WITH AN ISDN TERMINAL ADAPTER FOR EXPEDITIOUSLY AND AUTOMATICALLY PERFORMING ISDN SWITCH TYPE DETECTION AND SPID CONFIGURATION

BACKGROUND OF THE DISCLOSURE

1. Field of the Invention

The invention relates to a technique, particularly apparatus and accompanying methods, for inclusion within, e.g., ISDN DTE, and use in conjunction with an ISDN terminal adapter for automatically, rapidly and transparently providing ISDN switch detection and SPID configuration, and which specifically and advantageously expedites ISDN configuration of DTE and decreases long-term support costs of the adapter.

2. Description of the Prior Art

In recent years, a number of domestic and foreign telephone companies have begun offering integrated service digital network (ISDN) services to their customers. ISDN provides an integrated voice and data network that offers both increased bandwidth and significant flexibility over traditional analog telephone services. Inasmuch as subscriber charges for ISDN access are decreasing—with the decrease being rather noticeable for some telephone companies, demand for ISDN service and equipment is rising appreciably. Demand is particularly strong and growing for those subscribers who seek cost-effective high speed access to the Internet.

In particular, a basic rate (BRI—so-called "2B+D" service) ISDN interface provides higher speed bandwidth than both traditional analog, modem-based dial-up access modalities and comparably priced switched digital services. Each so-called B ("bearer") channel, which carries subscriber voice and/or data, provides 64 Kbits/second of bandwidth; while a D ("data") channel, which carries signaling and control information, provides 16 Kbits/second of bandwidth. For the bandwidth delivered, an ISDN line is significantly less expensive than a private leased line that supplies the same bandwidth. Furthermore, ISDN, being a digital end-to-end service, provides digital transmission channels that tend to be more accurate and reliable, from the standpoint of error rates and dropped connections, than are conventional analog connections. In addition, ISDN service provides rapid connect times which, in turn, provide faster support for those LAN (local area network) protocols that require relatively short latency across WAN (wide area network) connections.

Starting a few years ago, various networking and communications equipment manufacturers have been offering relatively inexpensive ISDN terminal adapters for subscriber end-use. Such a terminal adapter, also generically referred to as "data circuit terminating equipment" (DCE), once connected to an ISDN connection and to a subscriber's personal computer (PC), permits that subscriber to connect his(her) computer to, e.g., an Internet service provider and communicate at speeds approximately two to four times greater than a conventional analog modem. The computer so connected becomes so-called "data terminal equipment" (DTE). While the availability of these terminal adapters is clearly not the sole cause underlying the growth in ISDN usage, it, when combined with decreasing rates for ISDN service, is certainly a large and growing factor.

Ideally, an ISDN terminal adapter should be as easy for a subscriber to install and use as is a conventional analog modem. However, in practice, installing a conventional ISDN terminal adapter can be rather tedious, frustrating and time consuming. Many of these difficulties relate to a need for a user to manually supply the DTE, during its ISDN configuration, with a proper "SPID" (service profile identifier) for each different ISDN directory number (for each different B-channel) that has been assigned to the DTE. In that regard and with most ISDN switches, each different DTE that is to be connected to an ISDN switch needs to be electronically identified to that switch by the SPID(s) assigned to it by a local telephone company. While a connection is being established between the DTE, via the DCE, and the switch, the DTE will send, to the switch and for each different B-channel it desires to use, an initialization message containing a SPID, entered by the user, for that particular channel. In response, the switch will establish a connection, with the DTE but only through the B-channel(s) that has a correct SPID. If the user configures the DTE with an incorrect SPID, then all attempts by the DTE to establish a connection, via the DCE, to the switch and over the B-channel associated with the incorrect SPID will invariably fail.

In particular, SPID formats unfortunately vary across the United States. Furthermore, given the length of a SPID, a subscriber often incorrectly enters a SPID into a terminal adapter during its configuration. Also, local telephone company personnel frequently, though inadvertently, supply a subscriber with an incorrect SPID that differs from that which has been programmed, for that subscriber, into a local ISDN switch.

As to varying SPID formats, for the most part, ISDN service is quite uniform across the entire United States and Canada; however, slight differences do exist as to how ISDN service is implemented among various local telephone companies. In particular, a small number of ISDN switch manufacturers currently exists which supply such switches to local telephone companies in the United States. These manufacturers currently include Northern Telecom, Ltd., Siemens Corporation and. Lucent Technologies, Inc. Northern Telecom and Siemens currently offer one ISDN switch each (carrying product designations "DMS 100" and "EWSD", respectively)—each being a so-called "NI-1" type (referring to "National ISDN 1") switch and will be so referred to hereinafter. The Northern DMS 100 switch is available in two versions, i.e., an NI-1 version and a custom version—those versions differing only in their software. Lucent Technologies (previously a portion of AT&T) currently offers three different ISDN switches (a "5E Custom Multi-point", "5E NI-1" and "5E Custom Point-to-point"), though all implemented on a common 5ESS hardware platform (these switches differing in their generics, i.e., software). While these switches are generally compatible with each other, idiosyncratic differences, including differences in SPID format, do exist among the these switches. These differences complicate installation and use of an ISDN terminal adapter. A SPID in one format, hence suited for use with one type of ISDN switch, may not function with another type of ISDN switch; thus, completely preventing any ISDN calls from being established through the latter switch. Therefore, while configuring the adapter, a user must obtain SPIDs from his(her) local telephone company in the specific format for the local ISDN switch that will serve that user.

While configuring conventional ISDN terminal adapters for use with an ISDN line, an ISDN subscriber is usually required to manually enter SPIDs provided by his(her) telephone company for that line into the terminal adapter.

Depending on the terminal adapter and the interconnected terminal equipment, the SPIDs may be programmed either into the adapter or the terminal equipment (DTE) itself. In any event, a significant probability exists that the subscriber will enter such a SPID incorrectly or that one of the SPID(s) (s)he receives will itself be incorrect. As to the latter, when an ISDN line is ordered from a local telephone company, then, to provision the service, SPIDs are established for that line and then generally entered manually, as data, by telephone company personnel into a database, accessible by the ISDN switch. The local telephone company then notifies the subscriber of his(her) SPIDs. However, given the length of a SPID and similarity of some of its digits, an individual at the telephone company can inadvertently transcribe a SPID incorrectly from that which was just assigned and thus provide the subscriber with an incorrect SPID.

Hence, it is the subscriber, during installing his(her) ISDN terminal adapter, who often experiences first-hand the effect of an incorrect SPID. Since the vast majority of subscribers have no knowledge of ISDN control messages, let alone the particular type of local ISDN switch to which (s)he is to connect and the corresponding SPID format required by that switch, many subscribers quickly discover that their ISDN terminal adapters will not function, for reasons that are not immediately apparent to or resolvable by them, and hence can become very frustrated and rather irritated. Such subscribers can and often do expend considerable time and effort in telephone conversations with customer service representatives of the local telephone company and/or their terminal adapter manufacturers in an effort to locate and cure the problem—a SPID error.

As a result, conventional ISDN terminal adapters have acquired a reputation, at least in the United States and Canada, as being quite time-consuming to install and properly configure. To complicate matters, the same difficulties arise if the subscriber merely moves the ISDN terminal adapter, which may have been programmed with a given SPID in one SPID format, to a different location, i.e., one served by a switch that requires a different SPID format.

Fortunately, the art teaches the concept, for use within an ISDN terminal adapter, of automatically detecting the type of ISDN switch to which the adapter is connected and then properly and automatically configuring the SPID for that switch. See, co-pending U.S. patent application to Reginald P. Best et al entitled "Apparatus for an Improved ISDN Terminal Adapter Having Automatic ISDN Switch Detection and Methods for Use Therein" Ser. No. 08/852,659, filed May 7, 1997 (hereinafter the "Best '659 application"), which is assigned to the present assignee hereof and is incorporated by reference herein. In particular, the Best '659 application describes an approach in which an ISDN terminal adapter analyzes particular D-channel ISDN initialization messages received from the switch as well as, where appropriate, responses, in terms of particular D-channel ISDN messages, received from the switch to specific ISDN messages sent by the adapter, and sets the switch type accordingly. The switch type value is then used, in conjunction with a directory telephone number of the subscriber, to access an internal database, specifically a table, of pre-defined SPID formats, referenced in terms of telephone area codes and switch types, to access the possible SPID format(s) for the ISDN switch to which the adapter is likely connected. To do so, a personal computer (PC), connected as DTE and interacting with the terminal adapter, forms one or more SPID(s) appropriate for both the type of ISDN switch to which the adapter is connected and the area code of the subscriber; queries the switch, through the adapter, with each of these SPIDs to select and verify a correct SPID from those formed; and, based on the results obtained, further refines and updates, if necessary, the detected switch type.

While the approach taught by the Best '659 application is quite useful and advantageous in facilitating installation of an ISDN terminal adapter, it does possess several drawbacks.

First, this approach relies on a table of SPID formats indexed by area code. Unfortunately, as the demand for telephone numbers continues to escalate across the United States, area codes frequently change over time. Therefore, this places a burden on the manufacturer of the terminal adapter to constantly keep updating and disseminating a new version of the table each time an area code changes. Not only does this complicate manufacturer support of the adapter but also it significantly increases its long-term support cost.

Furthermore, this approach relies on detecting the switch type and thereafter separately configuring each SPID in sequence. The latter is accomplished by sending a D-channel ISDN initialization message from the terminal adapter, for just one SPID, followed by simply waiting for and then analyzing a response obtained from the switch, and if necessary, repeating this process, as needed with different initialization messages and SPID formats. Such an approach disadvantageously lengthens the time needed to detect the switch type and properly configure the SPIDs.

Therefore, a specific need exists in the art for a technique for use with an ISDN terminal adapter that not only automatically detects the type of ISDN switch to which the adapter is connected and properly configures its SPIDs for that switch, but also does so in a relatively short interval of time and with reduced long-term support costs. Advantageously, such a technique should further simplify and expedite installation and configuration of an ISDN terminal adapter, possibly increasing the demand for such adapters throughout a user community.

SUMMARY OF THE INVENTION

The present invention overcomes the deficiencies in the art and satisfies this need by providing a technique for inclusion within, e.g., ISDN DTE, and use in conjunction with, e.g., an ISDN terminal adapter (as DCE) which permits that DTE to automatically, rapidly and transparently detect a type of local ISDN switch to which the DCE is connected and then properly and automatically configure the SPIDs for use with that particular switch. Furthermore, my inventive technique reduces, with respect to conventional ISDN terminal adapters, long-term support costs that would be incurred by the manufacturer of the terminal adapter.

In accordance with my invention, the technique automatically detects the switch type by analyzing D-channel ISDN initialization messages received from the local ISDN switch as well as, where appropriate, responses, in terms of D-channel ISDN messages, received from the switch to specific ISDN messages sent by the adapter, and sets the switch type accordingly.

If the switch type is determined to be one that requires a SPID, then a SPID is formed using a predefined generic format, for each B-channel through which communication is being established, and sent to the switch, using an NI-1 terminal initialization request (also referred to herein as a "preliminary" initialization request message), to invoke initialization. Given the predominance of NI-1 ISDN lines currently in use, the generic SPID is in NI-1 format. Currently, a vast majority of ISDN lines in use across North America either uses this particular format or will be transitioning to this format.

If, however, the local ISDN switch is, e.g., an NI-1 switch but the switch will not recognize the generic SPID format, i.e., a different format is being used with this switch, as evident by the switch rejecting the SPID(s) in the generic format (i.e., rejecting the preliminary initialization request message), then one or more separate initialization request messages are subsequently sent to the switch. Here, each message contains a SPID but in a different format. The formats used across all such separate messages are ordered such that a first such message contains a SPID format that is most popularly used with this switch type, a next such message contains a next most popular SPID format in use with this type switch, and so forth. Such messages with different SPID formats are sent until either the switch initializes with a SPID in one such format or all such formats are exhausted.

In particular, to undertake SPID configuration, the switch type is used to access a database containing SPID formats indexed by switch type and, for a given switch type, ranked in terms of their usage popularity, i.e., relative number of installed subscriber lines using a particular SPID format for that type switch. A resulting list of SPIDs in different formats, for the detected switch type, is then formed, for each B-channel for which communication is being established, with SPID(s) in the most widely used format for that type switch being first on the list, followed by SPIDs in the next most widely used format and so forth. Hence, if two B-channels, each with its own directory number, are being established, then the list will contain a pair of differing SPIDs (one for each B-channel) for each different SPID format. Once the list is formed, separate initialization messages containing the first pair of SPIDs in the list are sent to the local switch to invoke initialization. If initialization succeeds, these particular SPIDs are then subsequently used. Also, to eliminate a need to repeat switch detection and SPID configuration whenever communication is later re-established with the same local switch, the switch type and SPID values are written to a registry, associated with the operating system of the PC, for subsequent access and use. Alternatively, if initialization fails, then each SPID in each successive pair of SPIDs in the list is sent, in a corresponding initialization message, to the local switch, until a pair of SPIDs in a common SPID format is found, if any from amongst those in the list, that successfully initializes with the switch. If no such pair of SPIDs is found, then an appropriate error message is generated and the user is prompted to verify that (s)he entered a correct 10-digit directory number.

To expedite initialization and reduce subscriber wait time, my inventive technique fabricates an initialization message for each different SPID that is to be used by the adapter and, if two such messages are formed, sends the second message without regard as to whether the local switch has responded to the first message. The local switch will then simply send its response to each such message. This advantageously eliminates a need, existing in the art, to wait for a switch response to the first initialization message prior to sending the second initialization message.

Since the SPID format database is stored in terms of usage popularity, and not area code, the database does not need to be updated whenever an area code is changed by a local telephone company (telco), thus simplifying and reducing the cost associated with long-term support. Furthermore, a SPID format database indexed by switch type and, within each type, ranked by usage popularity, is shorter, and hence easier to implement, than an area code based database.

As a feature of my inventive technique, the SPID format database can. be stored in a data file separate from an executable file that implements switch type detection and SPID configuration. As such, in the event another SPID format sees use in the future, then that format merely needs to be appropriately added to the SPID format file, i.e., inserted into the database, in a location dictated by its switch type and its relative popularity with respect to other formats for that switch type. The executable files themselves do not need to be modified. Moreover, given the increasing deployment of National NI-1 ISDN service, particularly using the generic SPID format, by local telcos throughout the United States and Canada, it is quite possible that the SPID format file may not need to be updated at all; thereby, further reducing long-term support costs which are likely to be incurred by the manufacturer of the terminal adapter.

BRIEF DESCRIPTION OF THE DRAWINGS

The teachings of the present invention can be readily understood by considering the following detailed description in conjunction with the accompanying drawings, in which:

FIGS. 5A–5C collectively depict a flowchart of switch type detection process 500, that detects the switch type of ISDN switch 30 in accordance with my inventive teachings, and is contained within ISDN T/A driver 237 and executes within PC 10; and FIG. 6 depicts a flowchart of SPID determination process 600, that determines a correct SPID in accordance with my inventive teachings, and is invoked by switch type detection process 500 shown in FIGS. 5A–5C.

To facilitate understanding, identical reference numerals have been used, where possible, to designate identical elements that are common to various figures.

DETAILED DESCRIPTION

After considering the following description, those skilled in the art will clearly realize that the teachings of my present invention can be readily utilized in substantially any ISDN data terminal equipment (DTE), which is interfaced through a data circuit terminating equipment (DCE), to an ISDN line, i.e., here a basic rate (2B+D) interface. Inasmuch as the present invention is particularly, though certainly not exclusively, suited for use in an ISDN terminal adapter, as DCE, that is situated internal to and which connects a personal computer (PC), as DTE, to an basic ISDN line, then, to simplify the following discussion, I will discuss my invention in that particular context. Clearly, after considering this discussion, those skilled in the art will readily appreciate how to incorporate my invention into any ISDN DTE, or as applicable DCE, and modify my invention, if necessary, to conform to the requirements of that specific DTE or DCE.

Figure 1:
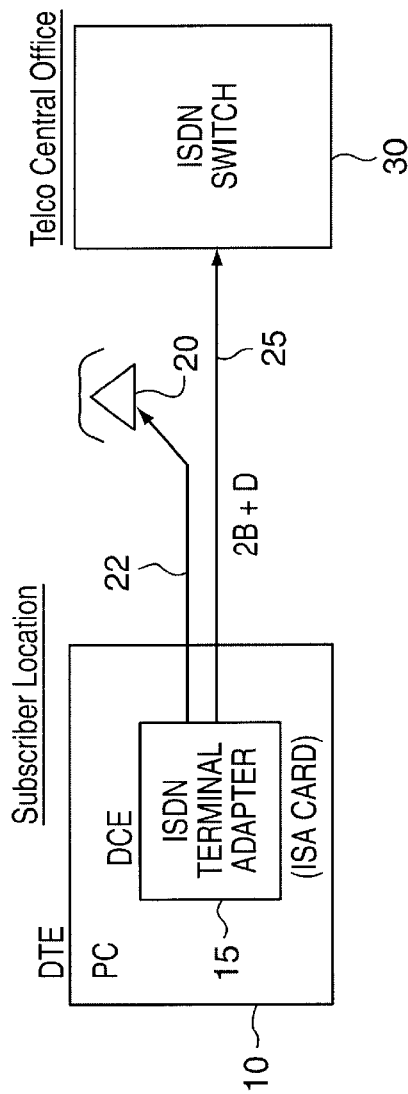
FIG. 1 depicts a high-level overall block diagram of a typical installation of ISDN terminal adapter 15 that incorporates my inventive teachings.

FIG. 1 depicts a high-level overall block diagram of a typical installation of ISDN terminal adapter (T/A) 15 that incorporates my inventive teachings.

As shown, ISDN T/A 15 is illustratively implemented as an ISA (Industry Standard Architecture) card which is inserted internally within PC 10, with the PC serving as DTE. The PC is situated at a subscriber location. The T/A, being DCE, is electrically connected, via its line jack and through a BRI (basic rate interface) ISDN (2B+D) interface 25, to ISDN switch 30 situated at a central office of a local telephone company (telco). Telephone 20 (or other analog telephone device), to the extent one is used, is connected, via leads 22, to an appropriate telephone jack on T/A 15.

Across the United States and Canada, local telcos have installed different types of ISDN switches. With most of these switches, each different DTE that is to be connected to such a switch needs to be electronically identified to that switch by one or more SPID(s) (service profile identifiers) that have been assigned to it by its local serving telco. During initial negotiations between the switch and the DTE, the DTE will send the switch, via interconnected DCE, an initialization message which contains a corresponding SPID for each different directory number (DN) (often one DN for each different B-channel) which that DTE then desires to use. In response, the switch will only establish a packet connection with the DTE, via the DCE, through that B-channel(s) that has a correct SPID. If the DTE is configured with an incorrect SPID, then all attempts by the DTE to establish a connection to the switch over the B-channel associated with the incorrect SPID will invariably fail. With respect to the installation shown in FIG. 1, after a data link (link layer 2) layer is successfully established between switch 30 and PC 10, via T/A 15, then, during subsequent negotiations to establish layer 3 (network layer) communications, the PC will send switch 30 a message, generally a SPID_INIT (SPID Initialization) message, containing a SPID for each different corresponding B-channel it desires establish a network connection.

However, the SPID format varies between different types of ISDN switches, which unfortunately complicates installation of T/A 15 within the PC.

Generally speaking, a SPID may contain, in order, a predefined prefix <P>, a ten-digit number formed of a three digit area code <AC> and a seven-digit subscriber directory number <DN>, followed by a predefined suffix <S>. The general form is given by <P>+<AC>+<DN>+<S>. However, within this general form, implementational differences exist as to the actual format used. In that regard, Table 1 below shows various exemplary (though not exhaustive) SPID formats for various different ISDN switch types.

TABLE 1

EXEMPLARY SPID FORMATS

| ISDN Switch Type | SPID |
| --- | --- |
| a) National ISDN | <DN> + 00 |
|  | <DN> + 1111 |
|  | 01 + <DN> + 011 |
|  | 01 + <DN> + 000 |
|  | <AC> + <DN> + 100 |
|  | <AC> + <DN> + 0111 |

TABLE 1-continued

EXEMPLARY SPID FORMATS

| ISDN Switch Type | SPID |
| --- | --- |
| b) DMS-100 Custom (Northern Telecom) | <AC> + <DN> + 0 |
|  | <AC> + <DN> + 00 |
|  | <AC> + <DN> + 1 |
|  | <AC> + <DN> + 01 |
|  | <AC> + <DN> + 11 |
|  | <AC> + <DN> + 2 |
|  | <AC> + <DN> + 20 |
|  | <AC> + <DN> + 200 |
|  | <AC> + <DN> + 2000 |
|  | <AC> + <DN> +x |
| where: x represents the last digit of DN repeated |  |
|  | <AC> + <DN> + yx |
| where: yx represents the last two digits of the DN repeated |  |
| c) AT&T (Lucent) Multipoint | <DN> + 0 |
|  | 01 + <DN> + 0 |

A SPID established for use with one type of ISDN switch will not likely function with another type of ISDN switch; thus, completely preventing any ISDN calls from being established through the latter switch. Hence, the SPID format used by the DTE must exactly match that required by the local switch to which that DTE, through the terminal adapter, will communicate. Not only can SPID inconsistencies arise during installation of a conventional ISDN terminal adapter but also they can arise later should the terminal adapter, if it was programmed with the SPIDs, be moved to a different location and connected to an ISDN line served by a different type of ISDN switch than that which the adapter was previously connected. Since both B-channels for any given BRI interface will be served by the same local ISDN switch, both SPIDs for these channels have the same format but, owing to the differing telephone numbers, will numerically differ from each other.

Advantageously, my present inventive technique, when incorporated into, e.g., ISDN DTE and used in conjunction with an ISDN terminal adapter (as DCE), permits the DCE to automatically and transparently detect a type of ISDN switch to which that DTE is connected and then properly and automatically configure the SPIDs for use with that particular switch. Not only does my technique facilitate rapid switch detection and SPID configuration but also it reduces, with respect to conventional ISDN terminal adapters, long-term support costs that will be incurred by the manufacturer of the terminal adapter.

In essence, my inventive technique automatically detects the switch type by analyzing D-channel ISDN initialization messages received from the switch as well as, where appropriate, responses, in terms of D-channel ISDN messages, received from the switch to specific ISDN messages sent by the adapter, and sets the switch type accordingly.

If the switch type is determined to be one that requires a SPID, then a SPID is formed using a predefined generic format, for each B-channel through which communication is being established, and sent to the switch, using an NI-1 terminal initialization request (also referred to herein as a "preliminary" initialization request message), to invoke initialization. One type of ISDN switch, specifically the AT&T (Lucent) Point-to-Point switch, does not require SPIDs. However, currently, local telcos are increasingly deploying National ISDN (NI-1) lines which do utilize SPIDs. Hence, the generic format is that associated with the vast majority of NI-1 lines currently in use. In that regard, I believe that the generic SPID should function properly with approximately 90% of the ISDN subscriber lines currently in use. Generally, this generic format is of the form <AC>+<DN>+<ID>+<TID> with the specific format being chosen as <AC>+<DN>+0101. Terms ID and TID respectively represent a sharing terminal identifier and a terminal identifier. The sharing terminal identifier, where used, is formed two digits ranging from "01" to "32", with a value of "01" being used unless multiple devices are connected to the associated B-channel. The terminal identifier, where used, is formed of two digits ranging from "01" to "08". Moreover, given the increasing deployment of NI-1 switches, the generic SPID format should function with most ISDN subscriber lines expected to be installed in the future. In that regard and currently, a vast majority of ISDN lines in use across North America either uses this particular format or will be transitioning to this format.

If, however, the local ISDN switch is, e.g., an NI-1 switch but the switch will not recognize the generic SPID format, i.e., a different format is being used with this switch, as evident by the switch rejecting the SPID(s) in the generic format (i.e., rejecting the preliminary initialization request message), then one or more separate initialization request messages are sent to the switch. Here, each message contains a SPID but in a different format. The formats used across all such separate messages are ordered such that the first such message contains a SPID format that is most popularly used with this switch type, a next such message contains a next most popular SPID format in use with this type switch, and so forth. Such messages with different SPID formats are sent until either the switch initializes with a SPID in one such format or all such formats are exhausted.

In particular, to perform SPID configuration, the switch type is used to access a database containing SPID formats indexed by switch type and, for a given switch type, ranked in terms of their usage popularity, i.e., relative number of installed subscriber lines using a particular SPID format for that type switch. A resulting list of SPIDs in different formats, for the detected switch type and for each B-channel for which communication is being established, is then formed with. SPID(s) for the most widely used format for that type switch being first on the list, followed by SPID(s) for the next most widely used format and so forth. Hence, if two B-channels are being established and both have directory numbers associated with them, then the list will contain a pair of differing SPIDs (one for each B-channel) for each different SPID format. Once the list is formed, separate initialization messages containing the first pair of SPIDs in the list are sent to the local switch to invoke initialization. If initialization succeeds, these particular SPIDs are then used. Also, to eliminate a need to repeat switch type detection and SPID configuration whenever communication is later re-established between the DTE and the same local switch, the switch type and SPID values are written to a registry, associated with the operating system of the PC, for subsequent access and use. Alternatively, if initialization fails, then each SPID in each successive pair of SPIDs in the list is sent in a corresponding initialization message, to the local switch, until a pair of SPIDs is found, in a common SPID format, if any from amongst those in the list, that successfully initializes with the switch. If no such pair of SPIDs is found, then an appropriate error message is generated. The user is then prompted to check the directory number (s)he entered for a data entry error. If the user entered a wrong DN, SPID detection will fail.

To expedite initialization and reduce subscriber wait time, my inventive technique fabricates an initialization message for each different SPID that is to be used by the adapter and, if two such messages are formed, sends the second message without regard as to whether the local switch has responded to the first message. The local switch will then simply send its response to each such message. This advantageously eliminates a need, existing in the art, to wait for a switch response to the first initialization message prior to sending the second initialization message.

Preferably, my technique is implemented through specific routines contained within an ISDN terminal adapter (T/A) driver, in conjunction with a configuration program, that executes on the PC. The SPID database is contained in a separate data file that is read and processed by the configuration program. Advantageously, this database is not indexed by area code and thus does not need to be updated whenever an area code is changed by a local telco, thus simplifying and reducing the cost associated with long-term support. Furthermore, a SPID format database indexed by switch type and, within each type, ranked by usage popularity, is shorter, and hence easier to implement, than an area code based database. Also, should another SPID format see future use, then that format merely needs to be appropriately added to the file, i.e., inserted into the database, at a location dictated by its switch type and its relative popularity with respect to other SPID formats for that switch type. The programs (executables) themselves do not need to be modified. Proceeding in this manner should significantly reduce on-going support costs which the terminal adapter manufacturer is likely to incur. Once the switch type and SPIDs have been completely determined, their values are then written, by the configuration program, to a registry associated with the operating system of the PC.

Moreover, given the increasing deployment of National NI-1 ISDN service by local telcos and the establishment of the generic format as a standard SPID format throughout the United States and Canada, it is quite possible that the SPID format file may not need to be updated at all; thereby, further reducing long-term support costs which are likely to be incurred by the manufacturer of the terminal adapter.

I will now describe PC 10 which executes my inventive technique, in terms of its various components, followed by describing various specific software modules that collectively implement my technique and their interaction with an operating system in the PC and the local ISDN switch. Thereafter, I will describe flowcharts of salient routines that collectively implement this technique.

Figure 2:
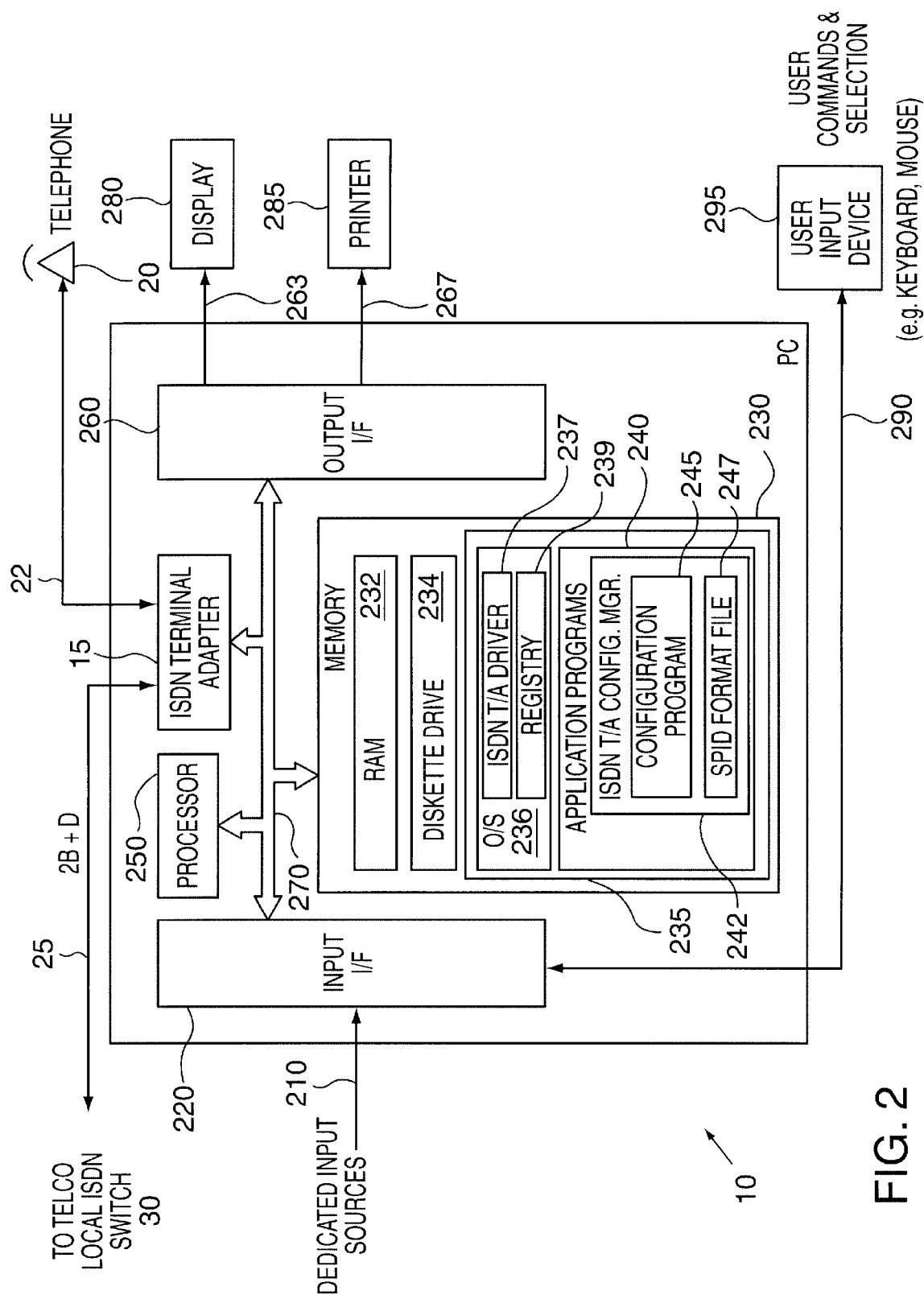
FIG. 2 depicts a high-level block diagram of PC 10 containing, as an internal PC card, ISDN terminal adapter 15.

FIG. 2 depicts a high-level block diagram of PC 10 containing, as an internal PC card, ISDN T/A 15.

As shown, PC 10 comprises input interfaces (I/F) 220, processor 250, ISDN T/A 15, memory 230 and output interfaces 260, all conventionally interconnected by bus 270. Memory 230, which generally includes different modalities, including illustratively random access memory (RAM) 232 for temporary data and instruction store, diskette drive(s) 234 for exchanging information, as per user command, with floppy diskettes, and non-volatile mass store 235 that is implemented through a hard disk, typically magnetic in nature. Mass store 235 may also contain a CD-ROM or other optical media reader (not specifically shown) (or writer) to read information from (and write information onto) suitable optical storage media. The mass store stores operating system (O/S) 236 and application programs 240; with the former containing ISDN T/A driver 237 and O/S registry 239 and the latter containing ISDN T/A configuration manager 242. Manager 242 itself contains ISDN T/A configuration program 245 and SPID format file 247, both of which collectively implement my inventive technique. O/S 236 is preferably implemented by the WINDOWS 95, WINDOWS 98 or WINDOWS NT operating system ("WINDOWS 95", "WINDOWS 98" and "WINDOWS NT" are registered trademarks of Microsoft Corporation of Redmond, Wash.); though a wide variety of other PC-based operating systems can be used instead with appropriate modifications being made to the implementation of the inventive technique. Since all aspects and components of the operating system, other than those that directly interact with my inventive technique, are irrelevant, I have omitted any discussion of them. Suffice it to say at this point, that ISDN T/A configuration manager 242, being one of application programs 240, and ISDN T/A driver 237 both execute under control of the O/S.

Incoming information can be applied to the PC from various illustrative external sources: network supplied information, e.g., from the Internet and/or other networked facility, through ISDN BRI connection 25 to ISDN T/A 15, or from a dedicated input source, via dedicated connection(s) 210, to input interfaces 220. In addition, incoming information, in the form of files or specific content therein, can also be provided by inserting a diskette containing the information into diskette drive 234 from which PC 10, under user instruction, will access and read that information from the diskette. Input interfaces 220 contain appropriate circuitry to provide necessary and corresponding electrical connections required to physically connect and interface each differing dedicated source of input information to PC 10. Under control of O/S 236, application programs 240 and ISDN T/A driver 237 exchange commands and data with the external sources, via ISDN BRI connection 25 or connection(s) 210, to transmit and receive information typically requested by a user during program execution.

Input interfaces 220 also electrically connect and interface user input device 295, such as a keyboard and mouse, to PC 10. Display 280, such as a conventional color monitor, and printer 285, such as a conventional laser printer, are connected, via leads 263 and 267, respectively, to output interfaces 260. The output interfaces provide requisite circuitry to electrically connect and interface the display and printer to the computer system.

Furthermore, since the specific hardware components of PC 10 as well as all aspects of the software stored within memory 235, apart from the modules that implement the present invention, are conventional and well-known, they will not be discussed in any further detail.

I will now discuss the various routines, in an overview fashion, that collectively implement my inventive technique and their interaction with salient components in O/S 236 and with the ISDN switch.

Figure 3:
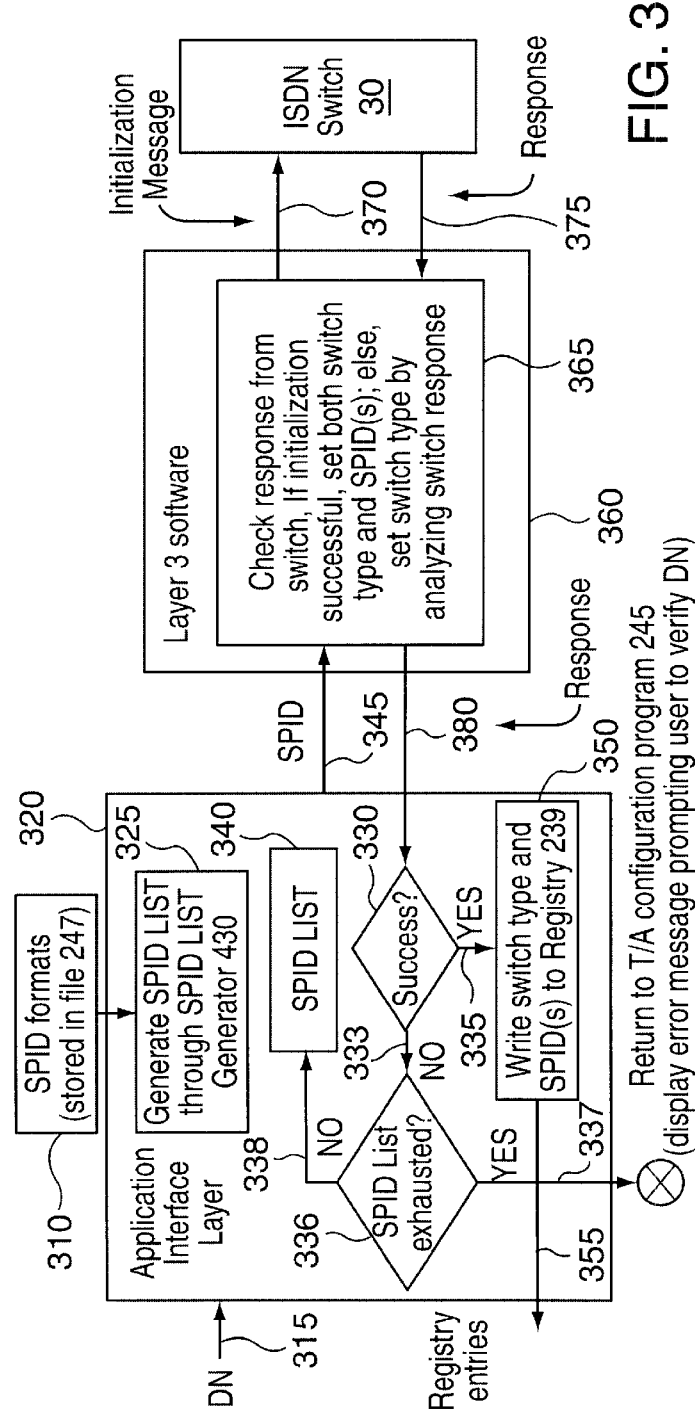
FIG. 3 diagrammatically depicts interaction which occurs between ISDN switch 30 and various software layers, specifically Application Interface layer 320 and OSI network layer 3 (also denoted as layer 360) as implemented through ISDN terminal adapter (T/A) driver 237 executing within PC 10, as shown in FIG. 2, for switch type detection and SPID configuration.
Figure 4:
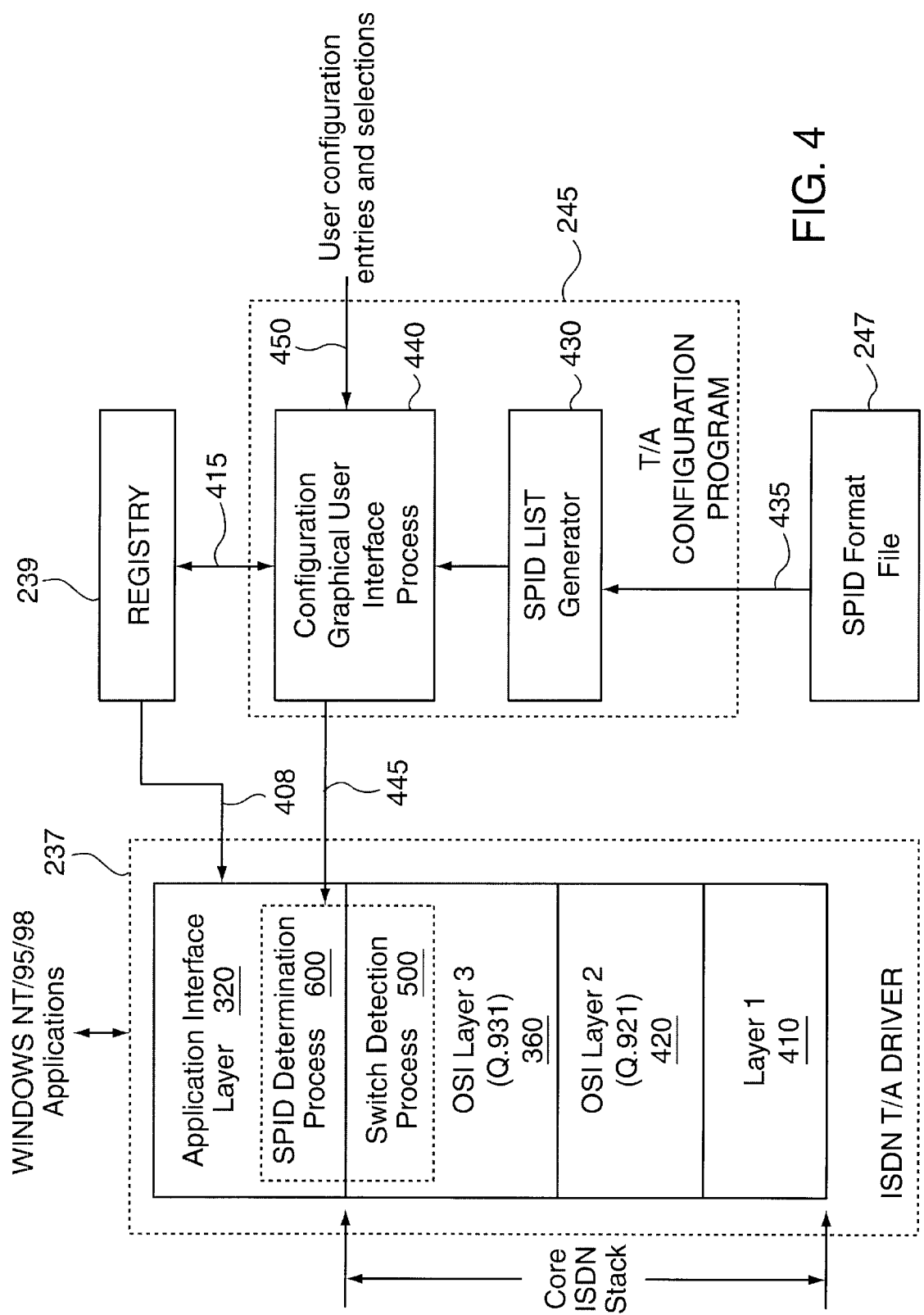
FIG. 4 depicts a block diagram of ISDN T/A driver 237, which incorporates the teachings of the present invention, along with various operating system components that interact with the driver and ISDN T/A configuration program 245 (as shown in FIG. 2)

In that regard, FIG. 3 diagrammatically depicts interaction which occurs between ISDN switch 30 and various software layers, specifically Application Interface layer 320 and OSI (Open Systems Interconnection) layer 3 (also denoted by reference numeral 360), as implemented through ISDN terminal adapter (T/A) driver 237. FIG. 4 depicts a block diagram of ISDN T/A driver 237, ISDN T/A Configuration program 245 and various operating system components with which they interact. To facilitate understanding, the reader should simultaneously refer to FIGS. 3 and 4 throughout the following discussion.

To simplify configuration, configuration manager 242 executes within PC 10 (see FIG. 2) to obtain suitable parameters, including the directory number(s), from the user (subscriber), and then the driver automatically detects the switch type and configures the SPIDs properly. To facilitate data entry, manager 242 generates a suitable graphical user interface (GUI) display through configuration GUI process 440, as shown in FIG. 4, on display 280 through which the user can enter and change various configuration parameters, including the directory numbers. Manager 242 is invoked during installation of ISDN T/A 15 and can be manually invoked thereafter whenever a user at PC 10 desires to change any previously set configuration parameter, or repeat switch type detection and/or SPID configuration.

As shown in FIG. 2, ISDN T/A configuration manager 242 contains ISDN T/A configuration program 245 and SPID format file 247. Configuration program 245, as shown in FIGS. 3 and 4, contains SPID list generator 430 and configuration GUI process 440. ISDN T/A driver 237 contains OSI layer 1 software 410, OSI layer 2 software 420 (implementing a Q.921 protocol), OSI layer 3 software 360 (implementing the Q.931 protocol), and Application Interface layer 320. The Applications Interface layer, which interfaces with a Core ISDN Stack (composed of OSI network layers 1–3) and with various application programs (collectively labeled, e.g., as "WINDOWS NT/95/98 applications") executing on client PC 10 (see FIG. 2), initiates or accepts calls to send and receive, respectively, B-channel data thus providing these applications with ISDN connectivity. As discussed above, file 247, as shown in FIG. 4, contains a database, indexed by switch type, of different SPID formats employed by that switch type and rank-ordered in terms of their usage popularity with that switch. A illustrative embodiment of the database contains the following lists of rank-ordered entries:

TABLE 2

RANKED LISTS OF SPID FORMATS
CONTAINED IN FILE 247 a) ranked SPID format list for National ISDN (NI-1) switches:
   1) 01 + <DN> + 000
   2) <AC> + <DN> + 0100
   3) <DN> + 000
   4) <AC> + <DN> + 0000
   5) 01 + <DN> + 011
   6) <AC> + <DN> + 0111
   7) <AC> + <DN> + 0001
   8) <DN> + 1111
   9) <AC> + <DN> + 100
  10) <AC> + <DN> + 000
  11) <AC> + <DN> + 0
  12) <AC> + <DN> + 00
b) ranked SPID format list for DMS-100 Custom switches:
   1) <AC> + <DN> + 01
   2) <AC> + <DN> + 0
   3) <AC> + <DN> + 11
   4) <AC> + <DN> + 00
   5) SPID 1 format: <AC> + <DN> + 1 **
      SPID 2 Format: <AC> + <DN> + 2 **
   6) SPID 1 format: <AC> + <DN> + 10 **
      SPID 2 format: <AC> + <DN> + 20 **
   7) SPID 1 format: <AC> + <DN> + 100 **
      SPID 2 format: <AC> + <DN> + 200 **
   8) SPID 1 format: <AC> + <DN> + 1000 **
      SPID 2 format: <AC> + <DN> + 2000 **
   9) SPID 1 format: <AC> + <DN> + 01 **
      SPID 2 format: <AC> + <DN> + 02 **
  10) SPID 1 format: <AC> + <DN> + 0100 **
      SPID 2 format: <AC> + <DN> + 0200 **
  11) <AC> + <7D DN> + x
  where: x represents the last digit of the
  DN repeated.
  12) <AC> + <7D DN> + yx
  where: yx stands for last 2 digits of the
  DN repeated.
  and where:
  ** indicates that the first and second SPIDs
  have different formats. For example,
  for directory numbers 1 and 2, the
  corresponding SPIDs would be 10-digit
  directory number (<AC> + <DN>) + 1 and the
  10-digit directory number +2,
  respectively.
c) SPID format list for AT&T (Lucent) Custom multi-point switches:
   1) 01 + <DN> + 0

For the most part and to the extent relevant to ISDN subscriber use, the National NI-1 and DMS-100 Custom ISDN switches operate identically, with exception of a few additional control messages provided by the DMS-100 switch but not provided in the NI-1 switch. Thus, to simplify processing in ISDN T/A driver 237 and within process 500, both being discussed below, in practice, no distinctions need to be made among these two switch types. In that case, the separate SPID format lists for these two switches can be combined into a single list rank-ordered by relative usage popularity across both of these switch types. The resulting contents of SPID format file 247 would be given in Table 3 below, with the terms x and yx being defined as set forth in Table 2 above.

TABLE 3

RANKED LISTS OF SPID FORMATS
(WITH COMBINED SPID LIST) ALTERNATELY
CONTAINED IN FILE 247 a) combined and ranked SPID format list for NI-1 and
DMS-100 Custom switches:
   1) 01 + <DN> + 000
   2) <AC> + <DN> + 0100
   3) <DN> + 000
   4) <AC> + <DN> + 0000
   5) 01 + <DN> + 011
   6) <AC> + <DN> + 0111
   7) <AC> + <DN> + 0001
   8) <AC> + <DN> + 0
   9) <AC> + <DN> + 00
  10) <DN> + 1111
  11) <AC> + <DN> + 100
  12) <AC> + <DN> + 000
  13) <AC> + <DN> + 01
  14) <AC> + <DN> + 11
  15) SPID 1 format: <AC> + <DN> + 1
      SPID 2 Format: <AC> + <DN> + 2
  16) SPID 1 format: <AC> + <DN> + 10
      SPID 2 format: <AC> + <DN> + 20
  17) SPID 1 format: <AC> + <DN> + 100
      SPID 2 format: <AC> + <DN> + 200
  18) SPID 1 format: <AC> + <DN> + 1000
      SPID 2 format: <AC> + <DN> + 2000
  19) SPID 1 format: <AC> + <DN> + 01
      SPID 2 format: <AC> + <DN> + 02
  20) SPID 1 format: <AC> + <DN> + 0100
      SPID 2 format: <AC> + <DN> + 0200
  21) <AC> + <DN> + x
  22) <AC> + <7D DN> + yx
b) SPID format list for AT&T (Lucent) Custom
multi-point switches:
   1) 01 + <DN> + 0

To prevent reader confusion, I will discuss my invention in the context of use with a separate list of SPID formats for each different switch type, e.g., that given in Table 2 above.

Configuration program 245 is an application program that forms a component of configuration manager 242 and is launched whenever this manager is invoked by the user to undertake an operation related to configuring an ISDN connection to be made through the terminal adapter. Configuration GUI process 440 generates a predefined configuration GUI display on display 280 (se FIG. 2) through which the user collectively, as symbolized by line 450, enters and changes configuration parameters, and manually invokes configuration operations, such as switch type detection and/or SPID configuration. Inasmuch as this GUI display is generated in a conventional manner which is irrelevant to the present invention, I will omit any further details of configuration GUI process 440. Driver 237 provides a message interface between the driver (and hence the ISDN T/A itself) and configuration program 245 for messages that are to transit, as symbolized by lines 408 and 445, between these two components. In this regard, this message interface is typically in one direction, from configuration program 245 to driver 237 with configuration program 245 querying driver 237 for information using a conventional Input-Output Control Interface (IOCTL interface).

When the user first invokes configuration manager 242, configuration GUI process 440 will depict, as part of the configuration GUI display, data entry boxes (also not specifically shown) through which the user can then enter each of his(her) area code (AC) and directory numbers (DNs) associated with his(her) ISDN line. Once these numbers are entered and the user affirms the entries, typically by clicking on either an "APPLY" or "OK" button displayed on the GUI display, configuration program 245 will write these numbers, as symbolized by line 415, into O/S registry 239 for subsequent access. If the user knows the SPID for each directory number, the user can also enter that SPID through separate boxes appearing in the configuration GUI. Alternatively and in most cases, the user will not know the SPIDs and thus can check a suitable box appearing in the GUI to instruct configuration program 245, in conjunction with switch detection process 500 and SPID determination process 600, to automatically detect the switch type and configure the SPIDs.

Automatic switch type detection and SPID configuration are implemented in OSI layer 3 (layer 360) and Application Interface layer 320, respectively. In particular, driver program 237 will first detect the switch type by invoking switch type detection process 500. This process, as described in detail below in conjunction with FIGS. 5A–5C and as indicated by block 365 (shown in specifically FIG. 3) in terms of its layer 3 processing, will determine the switch type based on specific initialization messages received from the switch, and, where necessary to distinguish between certain switch types, send additional initialization messages to the switch and analyze ensuing responses. Initialization messages sent by the switch to PC 10 and vice versa are symbolized by lines 375 and 370, respectively. Ultimately, process 500 will return a status message indicating whether the switch type was successfully detected, and, if so, will also return the detected switch type. Thereafter, process 500, if the user has so instructed it, will undertake, as part of Application Layer interface 320 processing, automatic SPID configuration; otherwise manager 242 will just write the switch type into registry 239.

To perform SPID configuration, process 500 will first access the directory numbers from registry 239 for the ISDN line to which the terminal adapter is connected. With these numbers, process 500 will form a separate SPID, using the generic NI-1 SPID format, for each different directory number. Process 500 will also invoke, as depicted in block 325, SPID list generator 430, to form a list of SPIDs, as represented by block 340, for each different directory number and for each different switch type, with the SPIDs for each switch type ranked in terms of their usage popularity for that particular switch type. Since generator 430 is conventional in nature and those skilled in the art can readily construct it, I will omit any details of its implementation.

Thereafter, process 500 will send each of these "generic" SPIDs, for both directory numbers, in a corresponding initialization message (a Terminal Initialization Request message in the NI-1 format as specified by a Q.931 protocol) to the local switch. If the switch successfully accepts these generic SPIDs, it will send appropriate "success" messages (one for each initialization message) back to the terminal adapter. The terminal adapter will pass this message to process 500 which, in turn, will process this message through both layer 3 and the Application Interface layer. As to layer 3, process 500 will store the generic SPIDs as current SPID values. The switch response will also be processed within the Application Interface layer. Within this layer and as symbolized by decision block 330, if the corresponding message for each SPID (specifically for NI-1 format) is a success message, then, execution will proceed via YES path 335, to block 350 which will write. the switch type and current SPIDs into registry 239 for association with ISDN T/A 15, with the resulting registry entries being symbolized by line 355. Process 500 will then terminate. At this point, in the detection processes both the switch type and SPID have been successfully detected; the ISDN T/A driver is now ready to either initiate or accept calls over the B-channels.

If, however, the local ISDN switch rejects the generic SPIDs by issuing appropriate reject messages to the terminal adapter (i.e., rejecting the preliminary initialization request messages), execution proceeds, via NO path 333, to decision block 336. This decision block determines whether any SPIDs then exist in SPID list 340. If no such SPID exists or the list is then exhausted, execution exits, via YES path 337, from the Application Interface layer. In this case, an error message will be displayed prompting the user to re-enter his(her) directory number(s)—an incorrect DN being the most likely cause of such a failure. Execution then returns to T/A configuration program 245. Alternatively, if SPID list 340 contains a SPID, as symbolized by NO path 338, process 500 will invoke SPID detection process 600 (see both FIGS. 3 and 4). This latter process, executing at the Application Interface layer, will then send an initialization request, to the switch, containing the first SPID in SPID list 340 for each directory number and determine, based on a response message received from the switch and as symbolized by decision block 330, whether the switch accepted the particular SPID or not. Process 600 will continue sending an initialization message specific to the detected switch type, using each successive SPID in SPID list 340 and for each directory number, until either a particular SPID in the list is accepted for each directory number and for a SPID format common to both SPIDs, or the list is exhausted. Once the SPIDs are accepted for both directory numbers, program 245 routes execution, via YES path 335, to operation 350 which, in turn, stores these SPIDs as current SPID values and writes these current SPIDs, along with the switch type, as appropriate entries into the registry. Once the SPID list is exhausted, then, as noted above, an error message is displayed to the user to prompt him(her) to check if (s)he entered the correct directory number and if not, to re-enter the DN and then restart the detection process.

I will now turn to a detailed discussion of inventive routines 500 and 600.

Figure 5B:
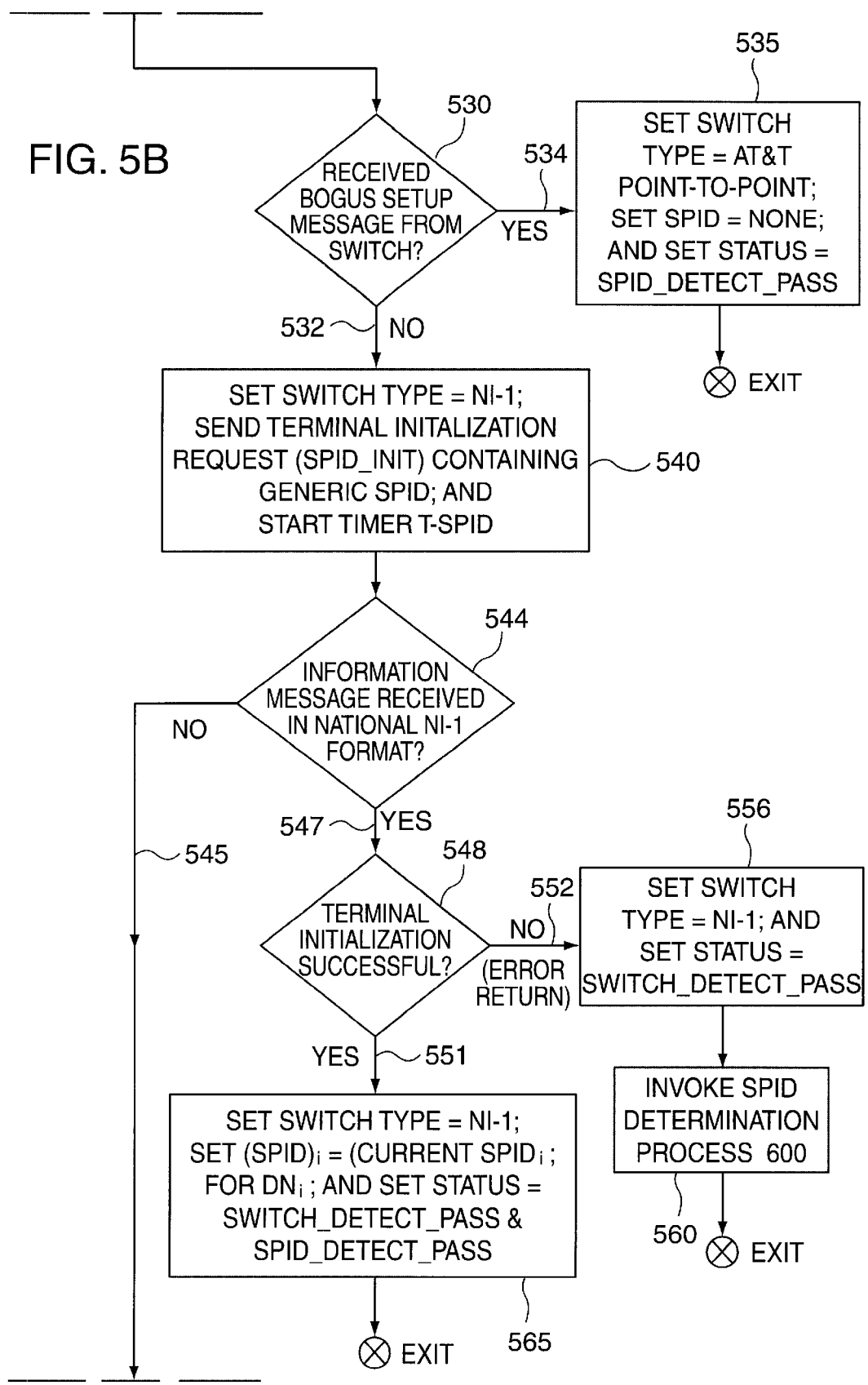
Figure 5:
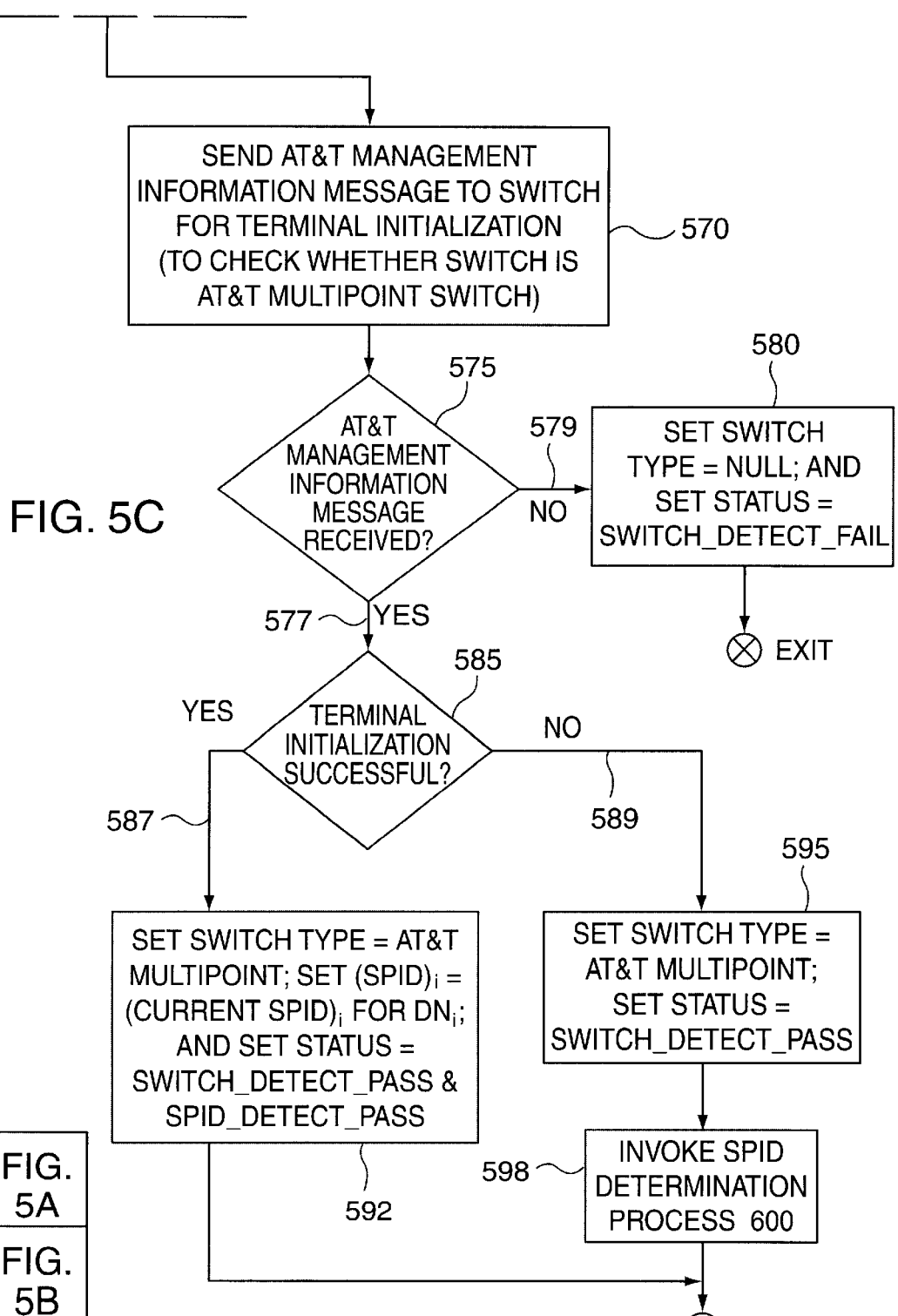
FIG. 5 depicts the correct alignment of the drawing sheets for FIGS. 5A–5C.

FIGS. 5A–5C collectively depict a flowchart of inventive switch type detection process 500, with FIG. 5 showing the correct alignment of the drawing sheets for FIGS. 5A–5C. As discussed above, this routine principally detects the ISDN switch type, and, if the switch type is unknown, forms a pair of generic SPIDs in NI-1 format, i.e., for both directory numbers, and tests whether these particular SPIDs are accepted by the local switch then connected to the ISDN T/A.

In particular, upon entry into routine 500, execution first proceeds to block 504. This block, when executed, establishes, to the extent still necessary—data link layer (OSI layer 2) communications between PC 10 and the local ISDN switch. During negotiations associated with establishing this layer, each B-channel that is to be used by PC 10 is assigned a unique terminal endpoint identifier (TEI) by the local switch. Any such channel, to the extent there is any, which has not been assigned a TEI value can not be initialized. PC 10 merely reflects the TEI value in each ISDN message it sends to the switch to identify the PC as the message originator, and specifically the particular B-channel, connected to the PC over which that message was sent. Hence, the actual value assigned by the switch to the TEI is immaterial to the adapter. Each B-channel which has been assigned a TEI during layer 2 needs to have a corresponding SPID to subsequently undertake network (layer 3) and higher layer initialization and communication. Once the data link layer has been fully established, execution proceeds to decision block 505 which determines, based on whether a user has checked a corresponding box appearing on the configuration GUI display, whether automatic SPID detection is to occur or not. If such detection is to occur, then decision block 505 routes execution, via YES path 508, to block 512. This latter block reads, from the registry, each ten-digit directory number (<AC>+<DN>) associated with the terminal adapter. Once this occurs, block 512 then forms a generic SPID for each of these directory numbers. Thereafter, block 512, invokes SPID list generator 325, to form a list of SPIDs for each of these directory numbers and for each of the different switch types, and to obtain the resulting SPID lists from generator 325. Once this occurs, execution proceeds to decision block 516. This block, when executed, determines, by querying the registry, whether the switch type has been determined for the particular ISDN switch to which the terminal adapter is presently connected. If the switch type is known, decision block 516 routes execution, via YES path 519, to block 520. The latter block, when executed, invokes SPID determination process 600 (which is discussed in detail below in conjunction with FIG. 6) to determine the proper SPIDs to use with this switch. Once process 600 fully executes, execution exits from routine 500. If the SPID detection succeeded, then both B-channels are functioning and hence the ISDN T/A driver is now ready to initiate or accept ISDN calls (i.e., to undertake call processing). If, however, the SPID detection failed, then an appropriate error message is generated and displayed by the T/A Configuration manager program. Alternatively, if the switch type is not known or if automatic SPID configuration is not to occur, then execution is directed, via NO paths 518 or 506, respectively, as shown in FIGS. 5A–5C, to decision block 525.

Decision block 525 determines, here too based on whether a user has checked a corresponding box appearing on the configuration GUI display, whether automatic switch detection is to occur or not. If such detection is not to occur, then execution merely exits, via NO path 529, from routine 500 to perform any remaining operations necessary for terminal initialization. Alternatively, if automatic switch detection is to occur, then decision block 525 routes execution, via YES path 527, to decision block 530.

Decision block 530, when executed, determines whether a "bogus" setup message has been received from the local ISDN switch. Such a message, which is unilaterally sent to the terminal adapter, on an unprovoked basis during layer 3 initialization and is usually discarded, is characteristic of an AT&T (Lucent) point-to-point switch. This particular type of ISDN switch does not utilize a SPID. As such, if such a setup message is received, then decision block 530 routes execution, via YES path 534, to block 535. This latter block sets the current switch type to "AT&T Point-to-Point", the SPID to "none" and a status indicator to signify that SPID configuration was successful (i.e., to a SPID_DETECT_PASS value). Thereafter, execution exits from process 500. The driver is now ready to undertake call processing, i.e., initiate or accept ISDN calls. Since both B-channels are functioning, the T/A configuration manager queries the driver for the detected switch type and SPID values and, in turn, writes these values into appropriate entries in the registry.

Alternatively, if a bogus setup message was not received, then decision block 530 routes execution, via NO path 532, to block 540. This latter block, when executed, sets the current switch type to NI-1 and sends a separate terminal initialization request (e.g., SPID_INIT) message (the preliminary initialization request message) containing a corresponding generic SPID, for each different directory number, to the local ISDN switch. If two B-channels are being initialized, then two separate requests are sent in sequence without waiting for a response to be received from the switch to the first such message. This block also starts a timer, T-SPID, which is illustratively 20 seconds in duration. This duration is specified by an ISDN protocol. However, to expedite the detection process, this value can be set to ten seconds or less, e.g., five seconds. This timer is stopped (though, to simplify the figures, through operations not specifically shown) whenever a message is received from the local ISDN switch or whenever the timer reaches the end of its timing interval, whichever occurs first. If timer T-SPID were to expire, the Q.931 protocol specifies that the value of the same SPID should be resent. However, here, a value of a next successive SPID in the list is sent instead of the same SPID. Once block 540 fully executes, execution proceeds to decision block 544.

Decision block 544 determines whether, in response to each initialization request message, an information message was received in NI-1 format from the local switch. If such messages were received, then decision block 544 directs execution, via YES path 547, to decision block 548. This latter block determines, based on the contents of these messages, whether terminal initialization was successful, i.e., the switch initialized the network layer in response to the. preliminary initialization request messages that contained the generic SPIDs. In the event this initialization fully succeeded, then decision block 548 routes execution, via YES path 551, to block 565. This latter block sets the current switch type to NI-1 and each SPID value that will be stored in the O/S registry to its corresponding current SPID, i.e., the corresponding generic SPID. In addition, block 565 also sets the status indicator to signify that switch type detection and SPID configuration were both successful (i.e., to a SWITCH_DETECT_PASS & SPID_DETECT_PASS value). Once this has occurred, execution exits from routine 500. At this point, both B-channels are functioning; hence, the ISDN T/A driver is ready to process calls. If, however, the ISDN switch returned an error message indicating that terminal initialization failed, then decision block 548 routes execution, via NO path 552, to block 556. This latter block sets the current switch type to NI-1 and sets the status indicator to signify that only the switch type detection succeeded (i.e., to a SWITCH_DETECT_PASS value). Since the initialization failure is most likely due to an incorrect SPID, block 560 executes to invoke SPID detection process 600 in an attempt to determine the correct SPIDs. Once process 600 fully executes, execution exits from routine 500. If the SPID detection succeeded, then both B-channels are functioning and hence the ISDN T/A driver is now ready to initiate or accept ISDN calls (i.e., to undertake call processing). If, however, the SPID detection failed, then an appropriate error message is generated and displayed by the T/A Configuration manager.

Alternatively, if the responding messages from the local ISDN switch to the request messages (preliminary initialization request messages) containing the generic SPIDs was other than NI-1 information messages, then decision block 544 routes execution, via NO path 545, to block 570. In this case, it is possible that the switch is an AT&T (Lucent) multi-point switch; though such switches are not commonly used. To test whether the local ISDN switch is a AT&T (Lucent) multi-point switch, process 500 will send a specific message unique to this type switch and, based on its response, set the switch type accordingly. In particular, block 570, when executed, will send an AT&T management information message to the local ISDN switch to request terminal initialization. Once this occurs, decision block 575 determines whether the switch responded by sending a management information message back to the terminal adapter. If the switch sent a message other than an AT&T management information message; then, decision block 575 routes execution, via NO path 579, to block 580. Since, at this point, process 500 has not been able to detect either the switch type or configure the SPIDs, block 580 sets the current switch type to NULL and sets the status indicator to signify that switch type detection failed (i.e., to a SWITCH_DETECT_FAIL value). Thereafter, execution exits from routine 500 and returns to the T/A configuration manager main program and displays an appropriate error message. If, however, the local switch did respond with an AT&T management information message, decision block 575 routes execution, via YES path 577, to decision block 585. This latter block determines from the contents of this message whether terminal initialization succeeded. If this message is an AT&T management information message but terminal initialization failed, then the switch is an AT&T (Lucent) multi-point switch but the SPID sent to the switch was incorrect. In this case, decision block 585 routes execution, via NO path 589, to block 595. This latter block sets the current switch type to AT&T multi-point and sets the status indicator to signify that only the switch type detection succeeded (i.e., to a SWITCH_DETECT_PASS value). Thereafter, block 598 executes to invoke SPID detection process 600 in an attempt to determine the correct SPIDs. Once process 600 fully executes, execution exits from routine 500. If the SPID detection succeeded, then both B-channels are functioning and hence the ISDN T/A driver is now ready to initiate or accept ISDN calls (i.e., to undertake call processing). If, however, the SPID detection failed, then an appropriate error message is generated and displayed by the T/A Configuration manager. Alternatively, if the contents of the AT&T information message returned from the local switch signifies that terminal initialization succeeded, then decision block 585 routes execution, via YES path 587, to block 592. This latter block sets the current switch type to AT&T multi-point and each SPID value, that is to be stored in the O/S registry, to its corresponding current SPID value. In addition, block 592 also sets the status indicator to signify that switch type detection and SPID configuration were both successful (i.e., to a SWITCH_DETECT_PASS & SPID_DETECT_PASS value). Once this has occurred, execution exits from routine 500. If the SPID detection succeeded, then both B-channels are functioning and hence the ISDN T/A driver is now ready to initiate or accept ISDN calls (i.e., to undertake call processing). If, however, the SPID detection failed, then an appropriate error message is generated and displayed by the T/A Configuration manager.

FIG. 6 depicts a flowchart of inventive SPID determination process 600. As discussed above, this routine, which is invoked by routine 500, sequentially applies different pairs of SPIDS, for both directory numbers, from the SPID list to the local ISDN switch and determines, based on response messages from the switch, which pair, if any, of these SPIDS, for both directory numbers, are accepted by that switch. If there is only one DN for the ISDN connection, then the process will provide a SPID for just one directory number associated with that connection.

As shown, upon entry into this routine, execution first proceeds to block 610. This block, when executed, obtains the first SPID in the list for each directory number as the current SPID for that number. Where two directory numbers are being used (for two different B-channel connections to the local switch), execution of block 610 will yield two SPIDs both in the same format though differing in their values due to the different directory numbers. Once this occurs, a loop is entered containing blocks 620–660. This loop will successively send SPIDs of different formats to the local switch until either initialization succeeds, i.e., correct SPIDs for the directory numbers were found, or the SPID list is exhausted.

Specifically, block 620, when executed, sends an initialization request, to the local ISDN switch, containing the current SPID for each directory number and in either NI-1 or AT&T multi-point form, depending on the detected type of that switch. If the user has entered two directory numbers, then block 620 forms two request messages and sends them to the switch without waiting for a response. Thereafter, decision block 630 determines, based on a response message(s) received from the switch (one response for each request message sent), whether initialization succeeded with each current SPID. If initialization succeeded, then decision block 630 routes execution, via YES path 633, to block 640. This latter block, when executed, sets the status indicator to signify that SPID detection succeeded (i.e., to a SPID_DETECT_PASS value). Once this has occurred, execution exits from routine 600. At this point, both B-channels are functioning, hence the ISDN T/A driver is ready to undertake call processing, i.e., initiate or accept ISDN calls.

Alternatively, if terminal initialization failed, then decision block 630 routes execution, via NO path 637, to decision block 640. This latter block determines whether an additional SPID, for each directory number exists in the SPID list, that has yet to be sent to the local switch to attempt initialization. If all the SPIDs in the list have been exhausted, then decision block 640 routes execution, via NO path 643, to block 650. This latter block, when executed, sets the status indicator to signify that SPID detection failed (i.e., to a SPID_DETECT_FAIL value). Once this has occurred, execution exits from routine 600 and returns to routine 500. Alternatively, if a SPID remains in the SPID list for each directory number, then decision block 640 routes execution, via YES path 647, to block 660. This latter block selects a next SPID in the SPID list, corresponding to each directory number, as each current SPID. Once this occurs, execution loops back, via path 665, to block 620 to form and send an appropriate initialization request message containing each current SPID to the local switch, and so forth.

Though I have described my invention as being implemented in an terminal adapter driver that interacts with an application program, i.e., an ISDN T/A Configuration manager, that executes on PC 10, my invention could alternatively be incorporated into this driver itself. Such an arrangement eliminates the need for a separate application and thus might simplify user interaction. However, a driver only implementation is likely to incur a loss of some flexibility and increased long-term support cost. In particular, in a driver only approach, the SPID format list would need to be included in the driver itself rather than being a separate file. Generally, a driver is implemented as a single executable file.

Moreover, requirements associated with certain operating systems, such as, e.g., "WINDOWS NT 5" operating system (also currently referred to as WINDOWS 2000), necessitate a driver only approach. Unfortunately, such operating systems may impose constraints on the driver that limit its flexibility. Presently, the "WINDOWS NT 5" operating system, as it currently exists, will not permit a driver to write entries into the operating system registry. Given this, the driver, which would implement my present invention, would be precluded from storing switch type and SPID values detected during one communication session with a local ISDN switch for use with that same switch during a subsequent session. Hence, the driver would need to perform switch type detection and SPID configuration for that switch each time network communications are to be re-established, through the terminal adapter, with that switch. While this should impart some delay from the start of network protocol negotiation until application layer communication can occur between the DTE and, through the switch, its far-end application peer; however, the amount of such delay would most likely be quite small and thus not noticeable to a user.

Furthermore, as noted above, the hardware and software necessary to implement my invention could alternatively be incorporated within the DCE itself, e.g., the terminal adapter. In many instances, the DCE will likely contain a microprocessor and associated memory. Hence, the software programmed into the DCE can include SPID list generator 430, processes 500 and 600, and SPID format file 247 (with such modifications as needed and as would be readily apparent to those skilled in the art for execution within the DCE rather than the DTE). As such, the DCE could undertake switch type detection and/or SPID configuration with user-supplied parameters, e.g., area codes and directory numbers, being entered into the DTE, stored in its O/S registry and communicated to the DCE. The switch type and/or configured SPIDs would then be returned from the DCE to the DTE for storage in the O/S registry. Advantageously, the implementation could be used to shift some of the processing burden associated with switch detection and SPID configuration from the DTE to the DCE.

Although a single detailed embodiment, with various modifications, which incorporates the teachings of the present invention has been shown and described in detail herein, those skilled in the art can readily devise many other embodiments that still utilize these teachings.

I claim:

1. Apparatus for automatically-configuring a service profile identifier (SPID) to be used with data terminal equipment (DTE), the DTE adapted to be connected through data circuit terminating-equipment (DCE) to a local integrated services digital network (ISDN) switch, the apparatus comprising, in either the DTE or DCE:

a processor;

a memory, connected to the processor, for storing both executable instructions and a database of pre-defined SPID formats, for a plurality of different types of ISDN switches, wherein corresponding ones of the SPID formats to be used with each one of said switch types are ordered in terms of relative popularity of usage of the corresponding formats with said one switch type so as to form a corresponding set of SPID formats for each of said switch types;

wherein, in response to the stored instructions, the processor:

a) generates, using the database of SPID formats, and sends to the local ISDN switch, connected to the DCE, an initialization request message for undertaking initialization with the local ISDN switch, wherein the request message contains a SPID having a most popularly used SPID format in the set corresponding to a type of the local ISDN switch; and b) successively repeats operation (a) but with a next successive most popularly used one of the SPID formats in the set corresponding to the type of the local switch, so as to form a separate successive initialization request message having a SPID in the format of the next successive most popularly used SPID format in the set, until either initialization occurs or all the SPID formats in the set corresponding to the type of the local ISDN switch are exhausted.

2. The apparatus in claim 1 wherein the database stores the corresponding ones of the SPID formats, for each one of the switch types, in order of relative popularity of usage with said one switch type.

3. The apparatus in claim 1 wherein the processor, in response to the stored instructions:
sends a preliminary initialization request message containing a SPID in a pre-defined generic SPID format to the local ISDN switch; and
analyzes a responding message, issued by the switch to the preliminary initialization request message, to determine whether the local ISDN switch initialized in response to the SPID in the generic format, and, based on a format of the responding message, the type of the local ISDN switch.

4. The apparatus in claim 3 wherein the processor, in response to the stored instructions and if the responding message indicates that the initialization did not succeed:
sends a predefined information message to the local ISDN switch to provoke a responding information message from the local ISDN switch to the DTE; and
analyzes the responding information message to determine the type of the local ISDN switch.

5. The apparatus in claim 3 wherein the processor, in response to the stored instructions, analyzes an initialization message issued by the local ISDN switch to the DTE to determine whether the local switch is of a type that requires a SPID.

6. The apparatus in claim 5 wherein the database stores the corresponding ones of the SPID formats, for each one of the switch types, in order of relative popularity of usage with said one switch type.

7. The apparatus in claim 5 wherein the predefined generic SPID format is an NI-1 ISDN SPID format.

8. The apparatus in claim 7 wherein the DCE comprises an ISDN terminal adapter (T/A) and the DTE comprises a computer to which the T/A is connected.

9. The apparatus in claim 8 wherein the database stores the corresponding ones of the SPID formats, for each one of the switch types, in order of relative popularity of usage with said one switch type.

10. The apparatus in claim 8 wherein the computer is a personal computer.

11. The apparatus in claim 10 wherein the T/A is internally situated within and is electrically connected to the personal computer.

12. Apparatus for automatically configuring a service profile identifier (SPID) to be used with data terminal equipment (DTE), the DTE adapted to be connected through data circuit terminating equipment (DCE) to a local integrated services digital network (ISDN) switch, the apparatus comprising, in either the DTE or DCE:

processor;
a memory, connected to the processor, for storing both executable instructions and a database of pre-defined SPID formats, for a plurality of different types of ISDN switches, wherein corresponding ones of the SPID formats to be used with each one of said switch types are ordered in terms of relative popularity of usage of the corresponding formats with said one switch type so as to form a corresponding set of SPID formats for each of said switch types;
wherein, in response to the stored instructions, the processor:
a) sends a preliminary initialization request message containing a SPID in a pre-defined generic SPID format to the local ISDN switch; and
b) analyzes a responding message, issued by the switch to the preliminary initialization request message, to determine whether the local ISDN switch initialized in response to the SPID in the generic format, and, based on a format of the responding message, the type of the local ISDN switch; and
c) if the responding message indicates that initialization did not succeed:
d) generates, using the database of SPID formats, and sends to the local ISDN switch, connected to the DCE, an initialization request message for undertaking initialization with the local ISDN switch, wherein the request message contains a SPID having a most popularly used SPID format in the set corresponding to a type of the local ISDN switch; and
e) successively repeats operation (d) but with a next successive most popularly used one of the SPID formats in the set corresponding to the type of the local switch, so as to form a separate successive initialization request message having a SPID in the format of the next successive most popularly used SPID format in the set, until either initialization occurs or all the SPID formats in the set corresponding to the type of the local ISDN switch are exhausted.

13. The apparatus in claim 12 wherein the database stores the corresponding ones of the SPID formats, for each one of the switch types, in order of relative popularity of usage with said one switch type.

14. The apparatus in claim 12 wherein the processor, in response to the stored instructions and if the responding message indicates that the initialization did not succeed:
sends a predefined information message to the local ISDN switch to provoke a responding information message from the local ISDN switch to the DTE; and
analyzes the responding information message to determine the type of the local ISDN switch.

15. The apparatus in claim 14 wherein the processor, in response to the stored instructions, analyzes an initialization message issued by the local ISDN switch to the DTE to determine whether the local switch is of a type that requires a SPID.

16. The apparatus in claim 15 wherein the database stores the corresponding ones of the SPID formats, for each one of the switch types, in order of relative popularity of usage with said one switch type.

17. The apparatus in claim 15 wherein the predefined generic SPID format is an NI-1 ISDN SPID format.

18. The apparatus in claim 17 wherein the DCE comprises an ISDN terminal adapter (T/A) and the DTE comprises a computer to which the T/A is connected.

19. The apparatus in claim 18 wherein the database stores the corresponding ones of the SPID formats, for each one of the switch types, in order of relative popularity of usage with said one switch type.

20. The apparatus in claim 18 wherein the computer is a personal computer.

21. The apparatus in claim 20 wherein the T/A is internally situated within and is electrically connected to the personal computer.

22. In apparatus for automatically configuring a service profile identifier (SPID) to be used with data terminal equipment (DTE), the DTE adapted to be connected through data circuit terminating equipment (DCE) to a local integrated services digital network (ISDN) switch, the apparatus situated in either the DTE or DCE and having:
   a processor, and
   a memory, connected to the processor, for storing both executable instructions and a database of pre-defined SPID formats, for a plurality of different types of ISDN switches, wherein corresponding one's of the SPID formats to be used with each one of said switch types are ordered in terms of relative popularity of usage of the corresponding formats with said one switch type so as to form a corresponding set of SPID formats for each of said switch types;
   the method comprising the steps of:
      generating, using the database of SPID formats, and sends to the local ISDN switch, connected to the DCE, an initialization request message for undertaking initialization with the local ISDN switch, wherein the request message contains a SPID having a most popularly used SPID format in the set corresponding to a type of the local ISDN switch; and
      successively repeating the generating step but with a next successive most popularly used one of the SPID formats in the set corresponding to the type of the local switch, so as to form a separate successive initialization request message having a SPID in the format of the next successive most popularly used SPID format in the set, until either initialization occurs or all the SPID formats in the set corresponding to the type of the local ISDN switch are exhausted.

23. The method in claim 22 further comprising the step of storing, in the database, the corresponding ones of the SPID formats, for each one of the switch types, in order of relative popularity of usage with said one switch type.

24. The method in claim 22 further comprising the steps of:
   sending a preliminary initialization request message containing a SPID in a pre-defined generic SPID format to the local ISDN switch; and
   analyzing a responding message, issued by the switch to the preliminary initialization request message, to determine whether the local ISDN switch initialized in response to the SPID in the generic format, and, based on a format of the responding message, the type of the local ISDN switch.

25. The method in claim 24 further comprising the steps of:
   if the responding message indicates that the initialization did not succeed;
      sending a predefined information message to the local ISDN switch to provoke a responding information message from the local ISDN switch to the DTE; and
      analyzing the responding information message to determine the type of the local ISDN switch.

26. The method in claim 24 further comprising the step of analyzing an initialization message issued by the local ISDN switch to the DTE to determine whether the local switch is of a type that requires a SPID.

27. The method in claim 26 further comprising the step of storing, in the database, the corresponding ones of the SPID formats, for each one of the switch types, in order of relative popularity of usage with said one switch type.

28. The method in claim 26 wherein the predefined generic SPID format is an NI-1 ISDN SPID format.

29. The method in claim 28 wherein the DCE comprises an ISDN terminal adapter (T/A) and the DTE comprises a computer to which the T/A is connected.

30. The method in claim 29 further comprising the step of storing, in the database, the corresponding ones of the SPID formats, for each one of the switch types, in order of relative popularity of usage with said one switch type.

31. In apparatus for automatically configuring a service profile identifier (SPID) to be used with data terminal equipment (DTE), the DTE adapted to be connected through data circuit terminating equipment (DCE) to a local integrated services digital network (ISDN) switch, the apparatus situated in either the DTE or DCE and having:
   a processor, and
   a memory, connected to the processor, for storing both executable instructions and a database of pre-defined SPID formats, for a plurality of different types of ISDN switches, wherein corresponding ones of the SPID formats to be used with each one of said switch types are ordered in terms of relative popularity of usage of the corresponding formats with said one switch type so as to form a corresponding set of SPID formats for each of said switch types;
   the method comprising the steps of:
      sending a preliminary initialization request message containing a SPID in a pre-defined generic SPID format to the local ISDN switch; and
      analyzing a responding message, issued by the switch to the preliminary initialization request message, to determine whether the local ISDN switch initialized in response to the SPID in the generic format, and, based on a format of the responding message, the type of the local ISDN switch; and
      if the responding message indicates that initialization did not succeed:
         generating, using the database of SPID formats, and sends to the local ISDN switch, connected to the DCE, an initialization request message for undertaking initialization with the local ISDN switch, wherein the request message contains a SPID having a most popularly used SPID format in the set corresponding to a type of the local ISDN switch; and
         successively repeating the generating step but with a next successive most popularly used one of the SPID formats in the set corresponding to the type of the local switch, so as to form a separate successive initialization request message having a SPID in the format of the next successive most popularly used SPID format in the set, until either initialization occurs or all the SPID formats in the set corresponding to the type of the local ISDN switch are exhausted.

32. The method in claim 31 further comprising the step of storing, in the database, the corresponding ones of the SPID formats, for each one of the switch types, in order of relative popularity of usage with said one switch type.

33. The method in claim 31 further comprising the steps of:

if the responding message indicates that the initialization did not succeed;

sending a predefined information message to the local ISDN switch to provoke a responding information message from the local ISDN switch to the DTE; and analyzing the responding information message to determine the type of the local ISDN switch.

34. The method in claim 33 further comprising the step of analyzing an initialization message issued by the local ISDN switch to the DTE to determine whether the local switch is of a type that requires a SPID.

35. The method in claim 34 further comprising the step of storing, in the database, the corresponding ones of the SPID formats, for each one of the switch types, in order of relative popularity of usage with said one switch type.

36. The method in claim 34 wherein the predefined generic SPID format is an NI-1 ISDN SPID format.

37. The method in claim 36 wherein the DCE comprises an ISDN terminal adapter (T/A) and the DTE comprises a computer to which the T/A is connected.

38. The method in claim 37 further comprising the step of storing, in the database, the corresponding ones of the SPID formats, for each one of the switch types, in order of relative popularity of usage with said one switch type.

* * * * *